United States Patent Office 3,524,703
Patented Aug. 18, 1970

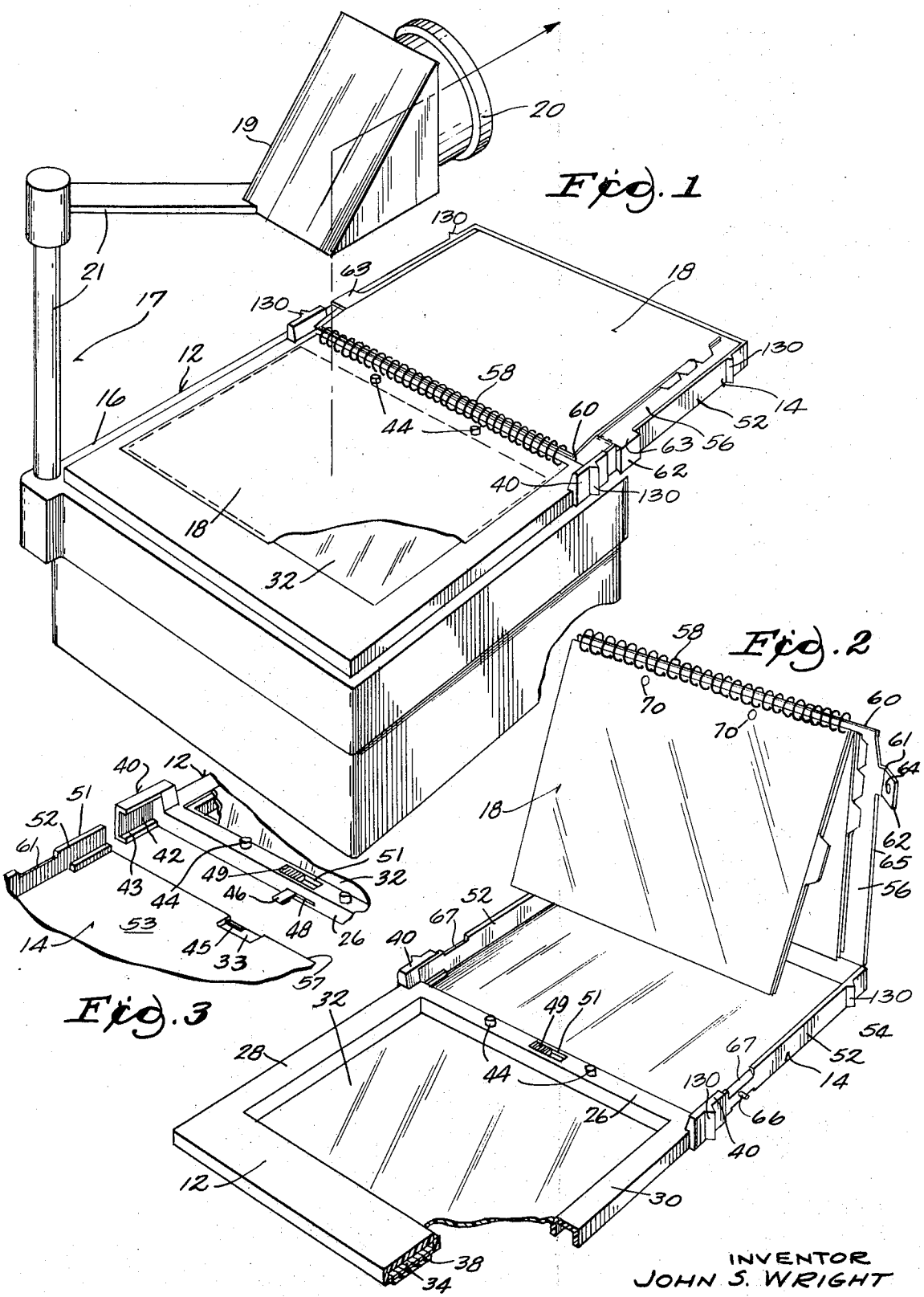

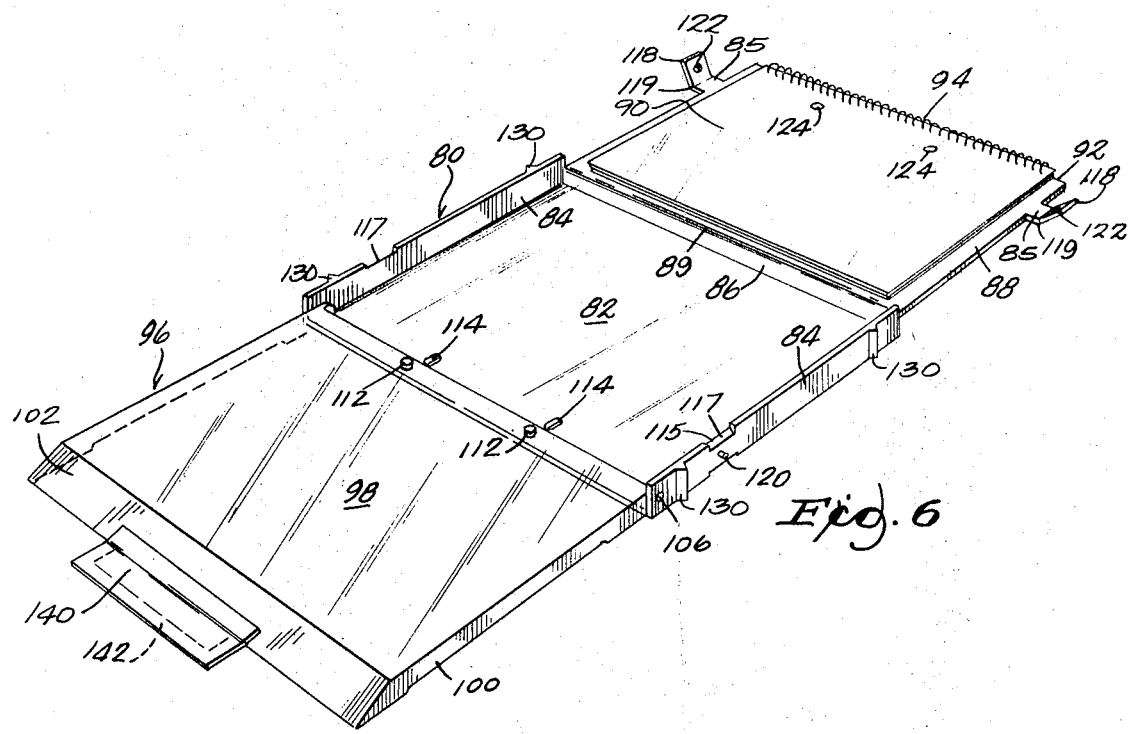

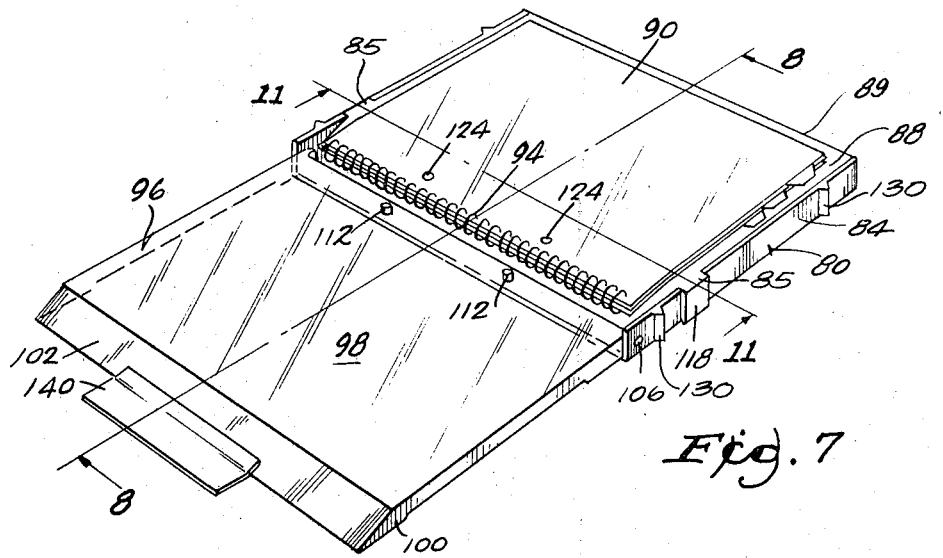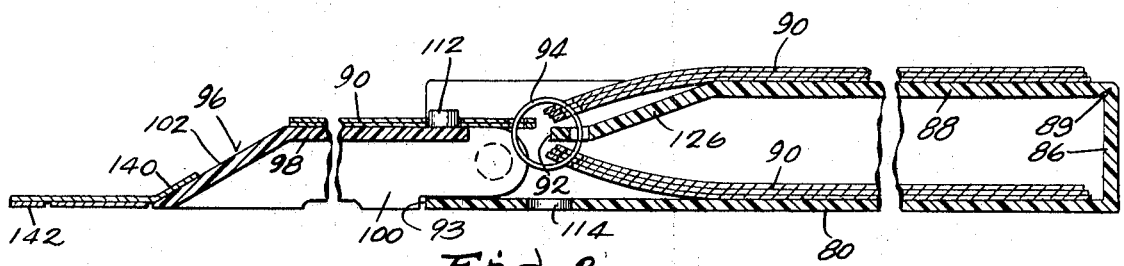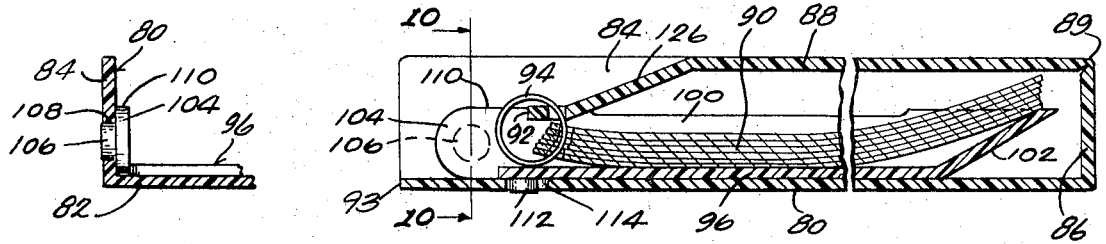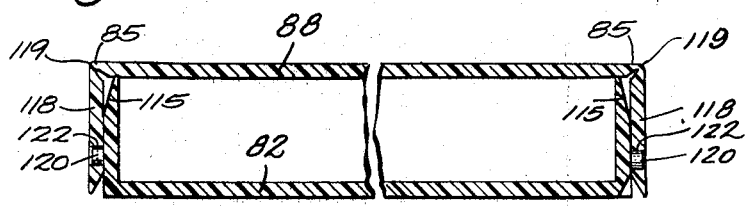

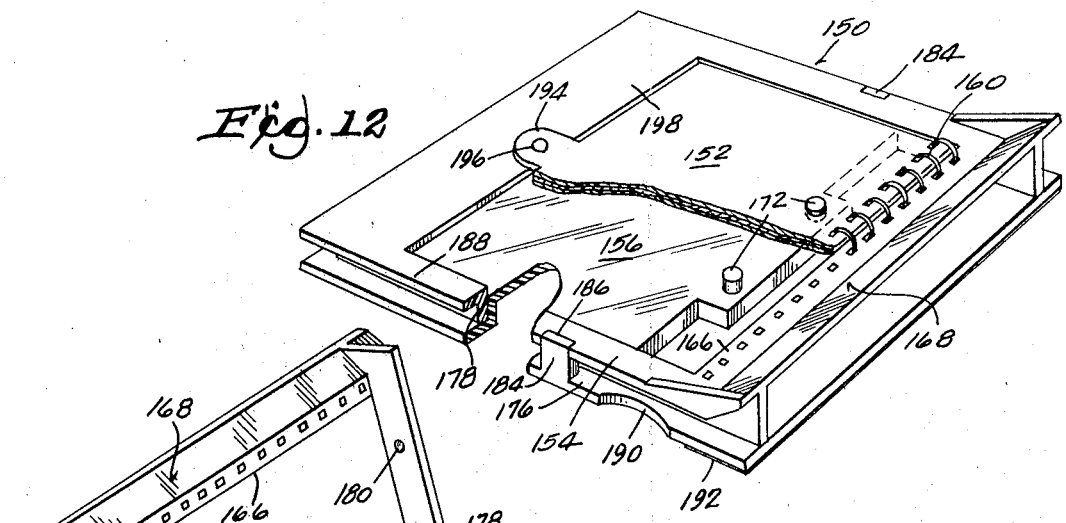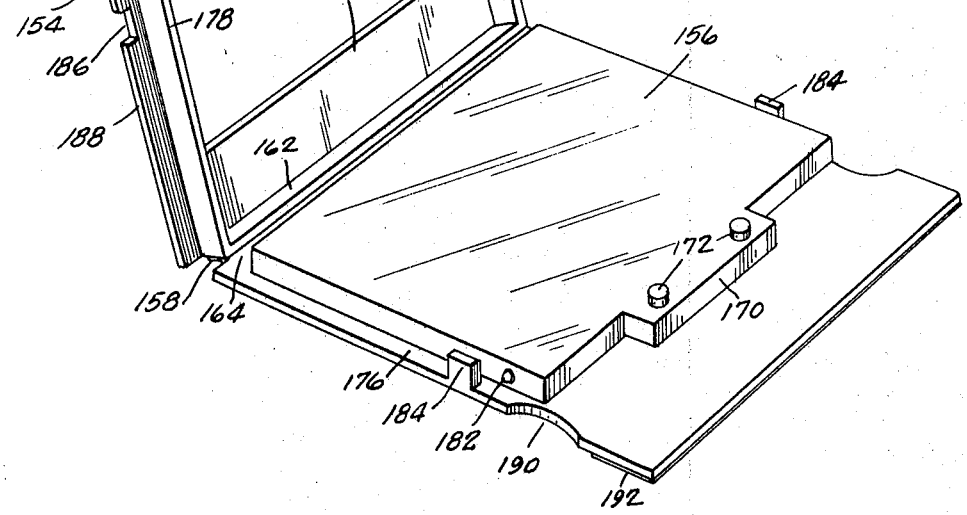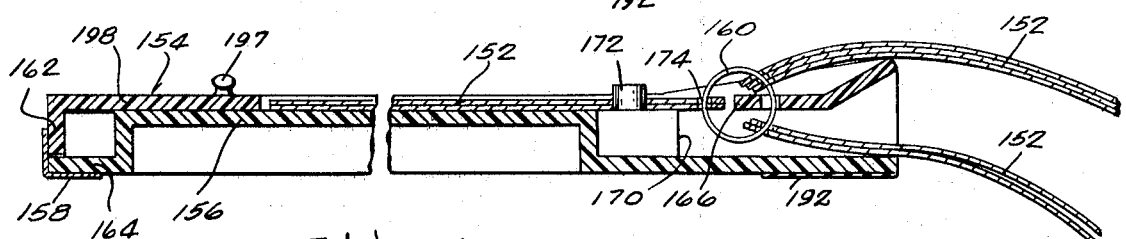

3,524,703
TRANSPARENCY STORAGE AND DISPLAY DEVICE FOR AN OVERHEAD PROJECTOR
John S. Wright, 6115 N. Lake Drive Court,
Milwaukee, Wis. 53217
Filed July 29, 1968, Ser. No. 748,255
Int. Cl. G03b 21/26
U.S. Cl. 353—35                                                     13 Claims

ABSTRACT OF THE DISCLOSURE

In an accessory transparency storage and display device a pack of transparencies are hingedly connected to the free margin of a first cover which, in turn, is hingedly connected to a second cover preferably having the form of a case which encloses the transparencies when they are disposed between the said covers. Since they are connected to the free margin of the first cover, they may be swung hingedly to lie on either side of such cover, or to project therefrom to lie on an auxiliary stage which is attached to the second cover opposite the side to which the first cover is hinged, such stage being foldable into or out of the second cover. A feature of the invention consists in the fact that a pin or pins connected with the auxiliary stage for the accurate registration of transparencies placed thereon are so disposed as to be in immediate proximity to the hinged connection of such transparencies with the first mentioned cover. In consequence, it is not necessary to manipulate the transparencies individually to remove them from the stage. Merely lifting the first cover will disengage from the dowels the transparencies hinged to said cover.

BACKGROUND OF THE INVENTION

This invention relates to an improvement in my transparency storage and display device described in my Pat. No. 3,253,358. The device disclosed in this patent includes an auxiliary stage placed on the primary stage of an overhead projector and a pack of transparencies connected to the free edge of one of the covers of a book. The free edge of the other cover of the book was inserted under a clamp along one side of an auxiliary stage, leaving the book in an overhanging relation with respect to the main stage of the projector. The transparencies were then moved successively from the cover to the auxiliary stage for projecting by the projector and after viewing were moved to a storage position within the book.

Accuracy of registration of the transparencies on the stage and accuracy of location of the image on the screen, particularly when the transparencies were superimposed, often required manual adjustment of the transparencies due to the looseness of the hinged connection with the cover. If the auxiliary stage moved or the transparencies were not accurately centered on the stage or superimposed, the location of the projected image on the screen or the inaccuracy in the projected image or improperly superimposed transparencies had to be adjusted. This required the attention of the operator and distracted from the presentation of the transparencies.

SUMMARY OF THE INVENTION

The improved transparency storage and display device of this invention includes a transparency pack hinged to the free margin of one cover of a storage book, whereof the other cover preferably comprises a storage case having side walls and an end wall. An auxiliary stage is either hingedly connected or removably secured to the case. The first said cover is hingedly connected to the end wall of the case and the said pack of transparencies is hingedly connected to the free edge of the cover. The hinge between the covers is so designed as to provide a substantially fixed axis to assure that the free edge of the cover is square for precise alignment of the transparencies.

The two hingedly connected covers and stage are in a series in which the free edge of the first cover is at one end of the series and the stage is at the other. Preferably, the stage has a holding means in the form of a weight with a non-skid material attached, or an adhesive strip or tab secured to the edge or side of the device remote from the connection with the second cover or case to engage the viewing surface of the projector and anchor the device in position when the device is placed on the main stage of the projector.

One or more, preferably at least two, register pins of appropriate cross section are porvided as an integral part of the auxiliary stage, being located proximately to the second cover to matingly engage corresponding register openings in each of said transparencies to accurately center the transparencies when superimposed on the auxiliary stage. By anchoring the auxiliary stage on the projector and registering each selected transparency on the auxiliary stage, every projected image will be accurately registered on the screen. A major advantage of having these pins or dowels in a position to engage apertures which are very close to the hinge margins of the individual transparencies consists in the fact that the transparencies need not be removed individually from the stage. Merely lifting the free swinging margin of the first cover will lift from the stage any and all transparencies which have been placed thereon for projection. This is despite the fact that there is a very close fit between the registry pins or dowels and the margins of the holes in the several transparencies. This is necessarily true if the dowels or pins are to perform the desired function of locating the transparencies with precision. Normally, it might be supposed desirable to locate these pins at the opposite side of the several transparencies. However, it has been found that if the pins are located anywhere other than in immediate proximity to the axis upon which the transparencies are hinged, the transparencies will bind or tear in the course of an attempt to lift them from the pin by manipulation of the cover.

Other objects and advantages will become apparent from the following detailed description when read in connection with the accompanying drawings in which:

FIG. 1 is a perspective view of an overhead projector with the accessory transparency storage and display device positioned on the primary stage of the projector.

FIG. 2 is a perspective view of the transparency storage case mounted on one side of the auxiliary stage with a portion of the auxiliary stage broken away to show the weight and nonskid attachment.

FIG. 3 is a view showing a section of the case and auxiliary stage disconnected.

FIG. 4 is a view in section of an accessory device mounted on the auxiliary stage.

FIG. 5 is a view in section of the accessory device mounted on the stage with the cover partly raised to show the disconnection of the transparencies from the register pins.

FIG. 6 is a perspective view of an alternate form of the accessory transparency and storage device with the auxiliary stage and cover unfolded.

FIG. 7 is a perspective view of the transparency storage and display device with the cover closed in the case in position for displaying transparencies on the auxiliary stage.

FIG. 8 is a view taken on line 8—8 of FIG. 7 showing the metal supported adhesive secured to the auxiliary surface of the projector and a transparency in registration with the register pins on the auxiliary stage.

FIG. 9 is a view in section similar to FIG. 7 with the auxiliary stage folded into the case and the cover closed with the transparencies stored within the auxiliary stage.

FIG. 10 is a view taken on line 10—10 of FIG. 9 showing the pivotal connection of the auxiliary stage.

FIG. 11 is a view taken on line 11—11 of FIG. 8 showing the cover lock tab and lift tab arrangement.

FIG. 12 is a perspective view of another modified transparency storage and display device.

FIG. 13 is a perspective view of the device of FIG. 12 with the frame opened.

FIG. 14 is a side view in section of the device of FIG. 12.

DESCRIPTION OF THE PREFERRED EMBODIMENTS

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 through 5, an accessory storage and display device is shown which includes an auxiliary stage or sub-stage 12 and a transparency storage case 14. As seen in FIG. 1 the auxiliary stage is placed on the primary stage 16 of the overhead projector 17 with the transparency storage case 14 extending in an overhanging relation outward from the primary stage 16 of the projector. A pack of transparencies 18 is hingedly connected to a cover 56 on the case 14 by a wire ring binder 58 for successive movement onto the auxiliary stage 12. Light projected through the transparency or transparencies on the auxiliary stage 12 is directed into a housing 19 held by an arm 21 for projection of the image through a lens 20 and onto a screen.

The transparency storage case 14 is formed from a substantially rigid plastic material and has a pair of side walls 52 and an end wall 54 projecting upwardly from a bottom panel 53. The cover 56 is formed as an integral part of the case and is hingedly connected to the upper edge 55 of the end wall 54 with the transparencies 18 hingedly connected by the ring binder 58 to the free edge 60 of the cover. The front edge 57 of the bottom panel 53 is placed in abutting relation to the auxiliary stage 12 when the case is mounted on the auxiliary stage. Since the case 14 and cover 56 are formed of a rigid material, the free edge 60 of the cover will always be positively located a fixed distance from the auxiliary stage and in the same place in the case precisely aligned with the front edge 57 of the panel 53.

The cover 56 is locked to the case 14 by means of a pair of lock tabs 62 hinged at 61 to tab extensions 63 provided on the edge 65 of the cover 56 and having an opening or aperture 64 to receive a pin 66 on the side wall 52 of the case. The tab extensions 63 seat in recesses 67 provided on the upper edges of the side wall 52 and determine the distance between the free edge 60 of the cover and the bottom panel 53. Each time the cover 56 is raised, as described more fully below, to move a transparency to a storage position within the case and the cover reclosed, the free edge 60 will always be precisely located with respect to the front edge 57 by means of the engagement of the tab extensions 63 in recesses 67.

The auxiliary stage 12 includes channel shaped side members 24 and 26 and edge members 28 and 30 with a transparent glass 32 supported within the frame formed by the side members and edge members. The auxiliary stage 12 is anchored on the primary stage 16 of the projector by a holding means in the form of a metal plate 34 and a strip 38 of nonskid material such as rubber. The plate 34 is retained within the channel shaped member 24 by an intermediate plate 25 and a number of screws 36 with the strip 38 of nonskid material secured to the intermediate plate 25. The metal plate 34 has sufficient weight to counterbalance the weight of the case 14 when the transparency storage case 14 is attached to the auxiliary stage and overhangs the edge of the primary stage as seen in FIG. 1. The nonskid material will be in surface area contact with the surface of the primary stage 16 of the projector and will resist any movement of the auxiliary stage 12 on the primary stage 16 of the projector. Friction feet may also be provided beneath the side wall 52 to aid in holding the stage 12 in a fixed position on the viewing surface.

The storage case 14 is mounted on the auxiliary stage 12 by a connecting means that includes the ends of the side walls 52 of the case and a pair of enlarged side wall extensions 40 on the auxiliary stage having channel shaped grooves 42. The side walls 52 of the case are inserted into the grooves 42 with the case retained in a coplanar relation with the auxiliary stage 12 by the engagement of the upper and lower edges 51 of the side walls 52 with the upper and lower surfaces 43 of groove 42. In some instances it may be desirable to provide the auxiliary stage with a fixed connection means for the case 14, and eliminate the auxiliary stage. Since the disclosed invention fixes the position of each transparency with regard to the case 14, the connecting means on the auxiliary stage should be so located that the case is properly located on the viewing surface.

The transparency storage case 14 is locked to the auxiliary stage 12 by means of a flexible lock tab 46 on the stage which engages a catch 45 in a notch 33 in the bottom panel 53 of the case (FIGS. 3, 4 and 5). The lock tab 46 extends outward through a slot 48 in side member 26 and is secured by a screw 11 to a block 47 slideably positioned with a groove 25 in the side member 26. The tab 46 is released from the catch 45 by sliding a serrated button 49. This extends upward from the block 47 through a slot 51 in the top of side member 26 and is slid to the right as viewed in FIG. 3 until the tab 46 clears the catch 45. For relocking the case 14, the block 47 for the lock tab 46 may be moved to the left manually after the case 14 is released. Alternatively, a spring (not shown) may be provided within the side member 26 to bias the block 47 to the left. The tab 46 should be left in the locking position so that it is ready to lock a case 14 in position on the auxiliary stage 12. Although only a single tab is shown in the drawings, additional tabs may be used to secure the case to the auxiliary stage.

When the transparencies 18 are to be shown, the cover 56 is pivoted about hinge 55 on end wall 54 far enough to allow for the pivotal movement of the transparencies 18 from the inside surface of the cover to the outside surface of the cover. The cover is then closed with the tab extensions 63 seated in the recesses 67 on the top of the side walls 52 and the free edge 60 square with respect to the register pins 44. The top transparency 18 is pivotally moved about the cover 56 until it lies on the surface of the auxiliary stage 12. Each transparency is accurately located on the auxiliary stage 12 by means of a pair of register or dowl pins 44 on side member 26 of the auxiliary stage 12 which engage register openings 70 provided in each of the transparencies. As each succeeding transparency 18 is superimposed on the previous transparency on the auxiliary stage, it will be registered with the previous transparency by the register pins 44, producing exact image-to-image alignment without any adjustment by the instructor.

Referring to FIG. 5, it will be noted that the register pins 44 are located on the side member 26 which is adjacent to the free edge 60 of the cover. The cover is provided with a sloped section 61 so that the free edge 60 will be substantially aligned in a coplanar relation to the transparent glass 32 on the auxiliary stage 12. When the cover 56 is raised to remove a transparency 18 from the auxiliary stage 12, the portion of the transparency adjacent the free edge 60 will be immediately lifted off the pins 44 and will be free to pivot against the inside surface of the cover 56. The pins 44 will not interfere in any way with the motion of the cover and the transparency or transparencies. When the cover 56 is again closed, the tab extensions 63 will seat in recesses 67 to properly align the free edge 60 with respect to the register pins 44. Proper alignment of the free edge 60 of the cover 56 with respect to the register pins 44 is essential to the proper display of the transparencies and is achieved because of the relatively fixed position of the hinge for the cover.

Referring to FIGS. 6 through 11, an alternate arrangement for the transparency storage and display device is shown. This device includes an auxiliary stage 96 hingedly connected to a transparency storage case 80 which has a pack of transparencies 90 hingedly connected to a cover 88 on the case. A single compact transparency storage and display device is formed by this arrangement wherein the auxiliary stage 96 and transparencies can both be stored within the case.

The case 80 is formed of a substantially rigid plastic and includes a flat base 82, a pair of side walls 84, and an end wall 86. The cover 88 is formed as an integral part of the case and is hinged at 89 to the end wall 86 for pivotal movement from an open position (FIG. 6) to a closed position (FIG. 7). The transparencies 90 are hingedly connected to the free edge 92 of the cover by a wire binder 94 for pivotal movement from one side of the cover to the other as described above.

The cover 88 is locked in the closed position by inserting pin 120 on the side walls 84 of the case into holes 122 in lock tabs 118 hinged at 119 to tab extension 85 provided on the top of the side walls 84 of the cover (FIG. 11). Each tab 85 seats in a notch or recess 117 provided on the top edge of the side wall 84. The free edge 92 of the cover is accurately located by the engagement of the tab extensions 85 in the recesses 117. In FIG. 11 the edge of the notch 117 is shown tapered at 115 to provide adequate clearance for the lock tab 118.

The auxiliary stage 96 is formed from a transparent plexiglass material with a flat upper surface 98 and a pair of side walls 100 along two sides of the stage with a sloped surface 102 provided at the front of the stage. Pivotal connection of the auxiliary stage 12 to the case is accomplished by means of pivot pins 106 provided on the extensions 104 of the side walls 100 which are inserted into apertures 108 in the side walls 84 of the case to allow for the pivotal motion of the auxiliary stage from a storage position within the case, FIG. 9, to an operative position coplanar with the case, FIG. 8. The coplanar relationship of the auxiliary stage and transparency case is maintained by the engagement of the flat edges 110 on the extensions 104 of the side walls with the flat surface of the base 82 (FIG. 8).

This transparency storage and display device is prepared for use by opening the cover 88 to the position shown in FIG. 6, and pivoting the auxiliary stage 96 about pins 106 until it is coplanar with the case. The transparencies 90 are moved from the inside surface of the cover 88 to the outside surface of the cover 88 and the cover returned to the closed position in the case as seen in FIG. 7 with the tab extensions 85 seated in the recesses 117. The free edge 92 will be accurately located with respect to the front edge 93 of the bottom panel 82 and the register pins 112 on the viewing stage 98.

The auxiliary stage 96 is placed on the primary stage of a projector, as in FIG. 1, with the storage case 80 extending outward from the side of the projector, and is anchored on the projector by a holding or anchoring means in the form of an adhesive tape 140. The tape 140 is secured to the front sloped surface 102 of the auxiliary stage 96 with the major portion of the adhesive tape 140 extending outward from the auxiliary stage for adherence to the surface of the primary stage of the projector. The major portion of the adhesive tape 140 which extends outward from the auxiliary stage has a metal strip 142 secured to the outer edge of the adhesive surface of the tape 140 to prevent the tape from curling back on itself when not in use. Since the primary stage of the overhead projector is made of a transparent plastic or glass, the adhesive tape will adhere readily to the surface of the projector. This adherence of the tape 140 to the primary stage of the projector has been found to be adequate to both anchor the auxiliary stage from tipping due to the weight of the transparency storage case and to prevent sliding of the case on the surface of the primary stage of the projector. The front sloped surface 102 is frosted on both sides to diffuse the light from the projector.

Once the auxiliary stage 96 has been anchored on the primary stage of the projector, the transparencies 90 can be successively moved onto the auxiliary stage 96 as described above. Each of the transparencies is provided with register openings 124 which will engage register pins 112 provided on the upper surface of the auxiliary stage to accurately center the transparency on the auxiliary stage. If two or more transparencies are superimposed on the auxiliary stage, each transparency will be accurately aligned with the other transparencies by the register pins 112. Openings 114 are provided in the case to accommodate the register pins 112 when the auxiliary stage 96 is pivoted into the case.

Referring to FIG. 8, it should be noted that the cover 88 is sloped downward at 126 so that the free edge 92 is substantially coplanar with the upper surface 98 of the auxiliary stage. The register pins 112 will then be in close proximity to the free edge 92 of the cover 88 and will not interfere with the removal of the transparencies 90 from the primary stage 96 when the cover is raised to remove a set of transparencies from the primary stage. This is similar to the arrangement shown in FIG. 5. When the cover is raised, the transparencies 90 on the primary stage 96 will automatically pivot to the inside surface of the cover and on reclosing the cover the transparencies which have been viewed will be stored inside the case with the remaining transparencies on the outside of the cover in position for movement to the auxiliary stage.

This device is normally stored on edge after the auxiliary stage 98 and transparencies 90 have been folded into the case. A pair of feet 130 are provided on one of the side walls 84 to allow sufficient clearance for the tab 118. A similar pair of feet 130 may also be provided on side wall 52 of the storage case 14 shown in FIGS. 1 through 5.

In both of the transparency storage and display devices described herein accuracy in projection of images is obtained by the positive location of the auxiliary stage on the primary stage of the projector and the accurate registration of the transparencies on the auxiliary stage. The attention of the operator can then be concentrated on the presentation of the transparencies and not interrupted to adjust the auxiliary stage or the transparencies.

In FIGS. 12 through 14 another modified transparency storage and display device 150 is shown which provides a complete compact unit in the form of a book for the storage and display of a single pack of transparencies 152. This device includes a skeletonized frame 154 hingedly connected to a transparent stage 156 with the pack of transparencies 152 hingedly connected to the frame 154 by means of a ring binder 160 for movement of one or all of the transparencies onto the surface of the stage 156 for viewing or for storage.

More particularly, the frame 154 is hingedly connected to the stage 156 by means of strips of adhesive tape 158 secured to a depending flange 162 on the frame 154 and a ledge 164 on the stage 156 (FIG. 14). The transparencies comprising pack 152 are hingedly connected to the inside edge 166 of the front cross member 168 on the frame 154 by the ring binder 160 for pivotal movement onto the surface of the stage 156 for viewing. The transparencies of pack 152 are removed from the stage 156 by raising the frame 154 to allow the viewed transparencies to pivot or rotate to a position below the cross member 168 on the frame 154. The inside edge 166 of the cross member 168 is spaced from the front edge 170 of the stage 156 to provide sufficient clearance for the ring binder 160, as seen in FIG. 13, and is aligned with the surface of the stage 156 to provide proper alignment of the transparencies on the stage 156.

Means are provided to accurately align the transparencies on the surface of the stage 156 to assure proper projection of superimposed figures on the transparencies. Although various means may be used, in this embodiment register pins 172 are provided along the edge 170 of the stage 156 and corresponding openings or apertures 174 are provided in each of the transparencies 152. As the transparencies are pivoted onto the stage 156, the openings 174 are engaged with the pins 172 and each succeeding transparency is also engaged with the pins.

Means are also provided to accurately align the front cross member 168 with the stage 156 each time the frame 154 is closed on the stage. This means includes a ledge 176 extending outward from each side of the stage 156 in a position to engage the lower edge of the side members 178 of the frame 154. The side members are locked to the stage 156 by means of the detent action of a knob 180 on the side member 178 which engages a socket 182 in the side wall of the stage 156 when the frame is closed. The edge 166 of the cross member 168 will always be returned to the same position with respect to the stage 156 when the cover is closed.

While various means may be provided to aid in releasing the frame 154 from the stage 156, in this embodiment a hold down block 184 is provided on ledge 176 on the stage 156 which extends upward through a notch 186 in the flange 188 of the frame to provide leverage in releasing the frame 154 from the stage 156. The operator pushes down on the block 184 while pulling up on the flange 188 to thereby press the stage 156 against the viewing stage of the projector when the frame 154 is raised. A notch 190 is provided in ledge 176 to allow sufficient clearance for the fingers of the operator when raising the frame.

The stage 156 is fixed with respect to the viewing surface of the projector by means of a friction tape 192 provided along the bottom of the stage 156. With this arrangement accuracy in positioning of the stage on the viewing surface of the projector is assured, as well as accuracy in locking the transparencies on the surface of the viewing stage.

The modification shown in FIGS. 12 through 14 provides a book which can be used to store conveniently both the pack of transparencies 152 and the auxiliary stage 156. When the frame 154 is closed on the stage 156, the pack of transparencies is rotated onto the surface of the stage 156. The transparencies are stored within the frame 154 by securing a tab 194 having a hole 196 on the top or cover of the transparencies to a button 197 provided on the cross member 198 of the frame. It should be noted that the cross member 198 is made with an opaque surface to diffuse any light projected from the viewing surface of the projector through the cross member 198.

What is claimed is:

1. A transparency storage and display device comprising a transparency and an auxiliary stage, the device having in hinged series connection a transparency, a first cover and a second cover, a first hinge means connecting the transparency to the first cover at a free margin with which the first cover is provided, second hinge means opposite said free margin and connecting the first cover with the second cover, and means for precisely locating the second cover with regard to said stage, the transparency being freely hingedly movable upon the first hinge means about the free margin of the first cover and movable therewith to rest on said stage with said first hinge means close to the stage, the stage having dowel means near the margin thereof proximate the first hinge means when said transparency rests on the stage, the said transparency having openings closely fitting said dowel means and engaged thereon when the transparency rests on the stage, the said transparency being readily disengageable from the dowel means when lifted by the first cover as the free margin of the first cover is hingedly moved upon the second hinge means away from the stage.

2. A transparency storage and display device according to claim 1 in which said transparency comprises one of a book of transparencies maintained by said first hinge means in hinged connection with each other and with said first cover and selectively hingeable about the first cover for superimposing on said stage a selected transparency of said book engaged with said dowel means for projection, the several transparencies comprising the book having like openings closely fitting the dowel means when engaged thereon, whereby all such transparencies so placed are in registry with each other for projection.

3. A device according to claim 1 having means for positioning the auxiliary stage on a projector, said means comprising an adhesive tape with a metal retaining strip along the edge of said tape.

4. A transparency storage and display device for an overhead projector comprising a transparency storage case, a cover hingedly connected to said case, at least one transparency hingedly connected to the free edge of said cover for movement from one side of said cover to the other, an auxiliary stage connected to said case in a position in which said transparency will rest flat upon the stage, the free edge of said cover being spaced a fixed distance from said auxiliary stage, said case having side walls and an end wall, said cover being hingedly connected to said end wall and said auxiliary stage being connected to said side walls.

5. A transparency display and storage device according to claim 4 wherein said auxiliary stage includes a pair of register pins and each of said transparencies includes a pair of register openings positioned to engage said register pins when said transparencies are placed on said auxiliary stage for viewing.

6. A device according to claim 5 including means to positively locate the free edge of said cover with the surface of the auxiliary stage when the cover is closed.

7. A transparency storage and display device for an overhead projector comprising an auxiliary stage having registry pins adjacent one of its margins, a transparency which includes register openings adjacent a corresponding margin and fitting the respective pins for engagement thereon, means connected to said stage and hingedly connected with the transparency adjacent its said corresponding margin for registering said transparency on said stage for projection, said means being bodily movable away from the level of said stage for withdrawing from said pins the transparency engaged thereon, said register pins and said register openings being located in a position to allow for the free movement of said transparency onto and off said stage.

8. A transparency storage and display device according to claim 7 wherein said means connected to said stage comprises a frame hingedly connected to said stage.

9. A transparency storage and display device according to claim 7 wherein said means connected to said stage comprises a transparency storage case having a cover hingedly connected to said case, said pack of transparencies being hingedly connected to said cover.

10. A device according to claim 7 wherein said means connected to said stage comprises a case having a pair of side walls and an opening in each of said side walls, said auxiliary stage includes a pair of pivot pins adapted to be inserted in said openings.

11. A device according to claim 7 wherein said means connected to said stage includes a case having side walls and said stage includes a pair of enlarged extensions having facing channel grooves to receive said side walls.

12. A device according to claim 11 including releasable lock means for securing said case to said auxiliary stage.

13. A device according to claim 7 including holding means on said stage to anchor said stage on the projector.

References Cited

UNITED STATES PATENTS

| | | | |
|---|---|---|---|
| 2,962,825 | 12/1960 | Bravo et al. | 40—106.1 |
| 3,253,358 | 5/1966 | Wright | 40—106.1 |
| 3,264,767 | 8/1966 | Coffman | 353—120 X |
| 3,269,261 | 8/1966 | Porter | 353—35 |

FOREIGN PATENTS 531,904 9/1939 Great Britain.

SAMUEL S. MATTHEWS, Primary Examiner

U.S. Cl. X.R.

353—120; 40—102, 106.1